Dec. 29, 1959     A. ZOLLINGER     2,919,088
MOTOR-DRIVEN CONSTANT SUPPORT HANGERS
Filed June 12, 1957     4 Sheets-Sheet 1
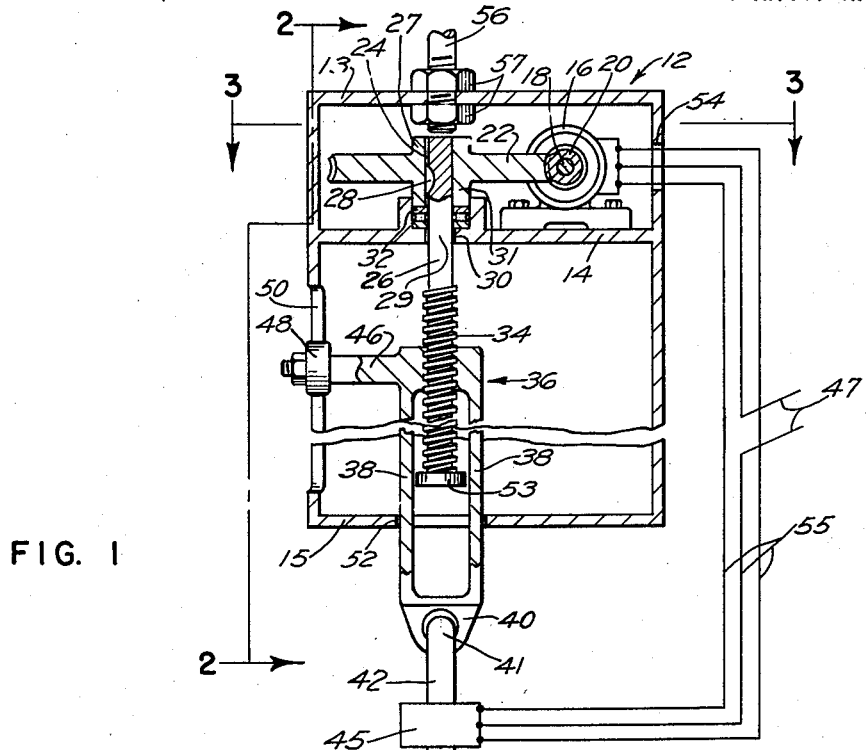
FIG. 1
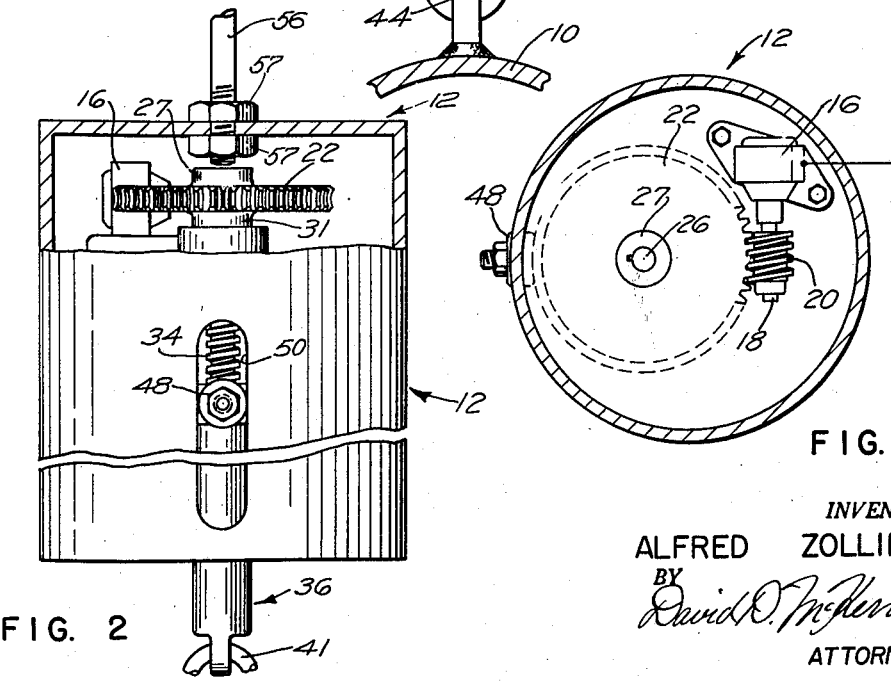
FIG. 2
FIG. 3
INVENTOR.
ALFRED ZOLLINGER
BY
David D. McKenney
ATTORNEY Dec. 29, 1959 A. ZOLLINGER 2,919,088
MOTOR-DRIVEN CONSTANT SUPPORT HANGERS
Filed June 12, 1957 4 Sheets-Sheet 2
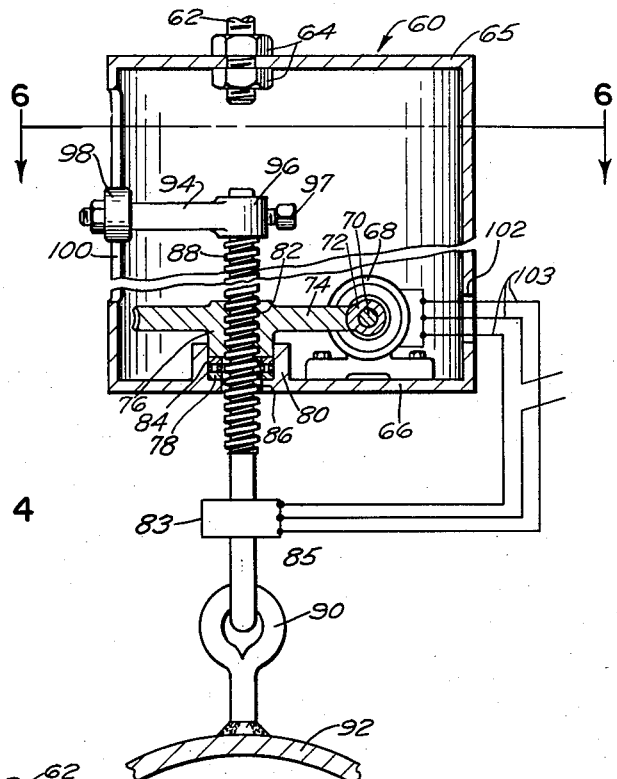
FIG. 4
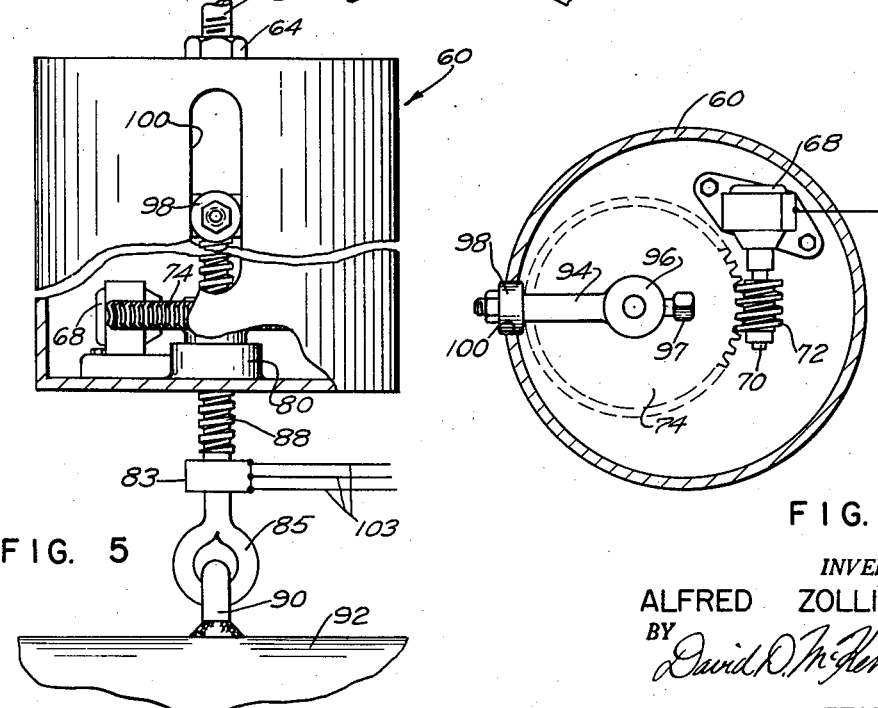
FIG. 5
FIG. 6
INVENTOR.
ALFRED ZOLLINGER
BY
David D. McHenney
ATTORNEY Dec. 29, 1959          A. ZOLLINGER          2,919,088

MOTOR-DRIVEN CONSTANT SUPPORT HANGERS

Filed June 12, 1957          4 Sheets-Sheet 3

INVENTOR.
ALFRED ZOLLINGER
BY
David R. McKenney
ATTORNEY

Dec. 29, 1959    A. ZOLLINGER    2,919,088
MOTOR-DRIVEN CONSTANT SUPPORT HANGERS
Filed June 12, 1957    4 Sheets-Sheet 4

INVENTOR.
ALFRED ZOLLINGER
BY
David D. McKenney
ATTORNEY

United States Patent Office 2,919,088
Patented Dec. 29, 1959

2,919,088

MOTOR-DRIVEN CONSTANT SUPPORT HANGERS

Alfred Zollinger, Providence, R.I., assignor to Grinnell Corporation, Providence, R.I., a corporation of Delaware Application June 12, 1957, Serial No. 665,331

14 Claims. (Cl. 248—58)

This invention relates to improvements in motor-driven constant support hangers for supporting loads.

An object of the present invention is to provide an improved, compact, efficient and relatively inexpensive constant support hanger, and more particularly to provide such a hanger in which the effective length of the hanger is automatically adjusted in response to changes in force applied by the load to the hanger to compensate for the changes in force. Another object is to provide such a hanger in which the length adjusting mechanism includes means for converting rotary motion of a rotating member into straight line motion of a cooperating member and in which means is provided for preventing the rotary motion of the rotating member from exerting a rotary force and hence torque on the load. Another object is to provide such a hanger in which the exertion of a rotary force on the load is prevented by providing means associated with the hanger for restraining the cooperating member to which straight line movement is imparted, against rotary motion, the load being supported by the cooperating member. Another object is to provide such a hanger in which rotary force imparted to the cooperating member is neutralized by the counter force exerted by the cooperating member on the rotating member by resistance of such cooperating member to rotation. Preferably the rotary force imparted to the cooperating member and the counter force are applied to a portion of the hanger, for example, the frame, in opposite directions so that they cancel each other out, the two being substantially equal. Consequently, substantially all of the rotary force which is not converted into straight line motion is neutralized and retained within the hanger and substantially no rotary force is transmitted externally of the hanger, so that no rotary force, and hence no torque, is applied to the load. Furthermore, since the rotary forces are neutralized by each other neither one of them tend to rotate the hanger with respect to the building structure so that no rotary force and hence no torque is applied to the means for attaching the hanger to the building structure, which in some instances comprises a rod or rods. Thus, although rotary motion is utilized to adjust the hanger length the hanger is torque free.

Another object is to provide a constant support hanger in which constant support is maintained by a mechanism for adjusting the length of the hanger in response to changes in force applied by the load to the hanger, in which such mechanism includes a screw member and nut assembly and in which the screw member is rotatable in response to such changes in force to impart straight line motion to the nut to change the length of the hanger, the load being supported by the nut.

It is another object of the present invention to provide a hanger which utilizes a motor to change the length of the hanger to maintain constant support, which has a frame and a vertical screw member with a nut member threaded thereon, in which the motor rotates one of these members to move the other vertically and in which a guide on the frame prevents rotation of the vertically movable member.

Another object of the invention is to provide a hanger which utilizes a motor to change the length of the hanger to maintain constant support, which has a frame and a vertically disposed screw on the frame with a nut threaded on this screw, in which the motor rotates the screw to move the nut vertically and in which a guide on the frame prevents rotation of the nut.

Another object of the invention is to provide a hanger which utilizes a motor to change the length of the hanger to maintain constant support, which has a frame and a vertically disposed screw on the frame with a nut threaded on this screw, in which the motor rotates the nut to move the screw vertically and in which a guide on the frame prevents rotation of the screw with respect to the frame.

Another object of the invention is to provide a hanger which utilizes a motor to change the length of the hanger to maintain constant support, which has a frame and at least two vertically disposed screws on the frame with a nut threadedly engaged on these screws and in which the motor rotates the screws to move the nut vertically.

Another object of the invention is to provide a hanger which utilizes a motor to change the length of the hanger to maintain constant support, which has a frame and at least two vertically disposed screws on this frame with a nut threaded on each such screw, in which the motor rotates the nuts to move the screws vertically and in which the screws are connected together by a cross piece which supports the load.

Other objects will appear hereinafter.

The accompanying drawings show and the following specification describes preferred embodiments of the present invention. However, they are merely illustrative of the invention which is not intended to be limited to them.

In the accompanying drawings:

Fig. 1 is a cross-sectioned front elevation view of a preferred form of the present invention with the motor switch and motor switch control being shown diagrammatically;

Fig. 2 is a side elevation view taken on line 2—2 of Fig. 1;

Fig. 3 is a view taken on line 3—3 of Fig. 1;

Fig. 4 is a cross-section front elevation view of another form of the present invention with the motor switch and motor switch control being shown diagrammatically;

Fig. 5 is a side elevation view of the device shown in Fig. 4 with portions of the frame broken away to more clearly show the construction;

Fig. 6 is a view taken on line 6—6 of Fig. 4;

Figure 7:
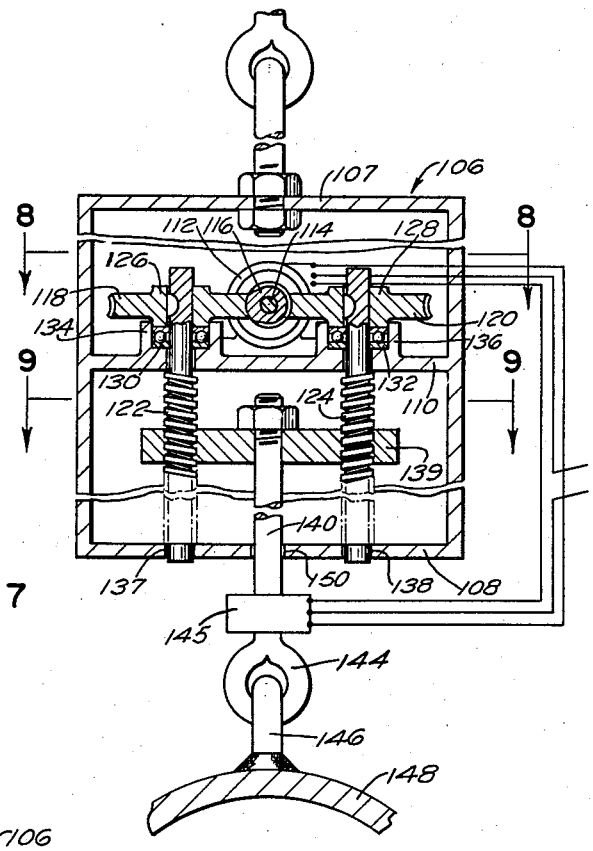
Fig. 7 is a cross-section side elevation view of another embodiment of the invention with the motor switch and motor switch control being shown diagrammatically.
Figure 8:
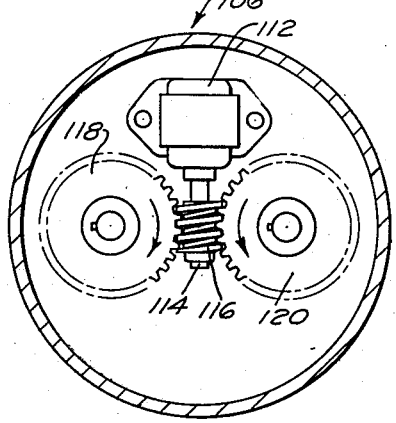
Fig. 8 is a view taken along the line 8—8 of Fig. 7.
Figure 9:
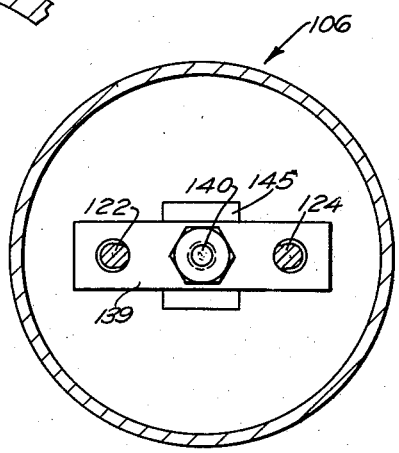
Fig. 9 is a view taken along the line 9—9 of Fig. 7.

Referring now more particularly to Figs. 1 to 3 of the drawings, the load to be supported is designated by the numeral 10 and is shown as a section of a horizontally extending pipe which forms a part of a piping system having vertically extending portions which are subject to longitudinal elongation and contraction due to temperature changes and other conditions, the horizontally extending pipe being moved vertically by such elongation and contraction. Such a pipe section is typical of loads which require support and at the same time must be free to move vertically within a limited range. The hanger comprises a hollow cylindrical frame 12 which has a top wall 13, a bottom wall 15 and an intermediate horizontal floor portion 14 on which an electric motor 16 is mounted so that its drive shaft 18 is generally horizontal. The end of this drive shaft is provided with a worm gear 20 which engages and drives a worm wheel 22 fixedly secured to the upper end 24 of a screw member 26 by a flange 27 and key 28. The rod 26 is vertically disposed and has a portion 29 located below the worm wheel 22 which is received in a journal 30 formed in the floor portion 14 of the frame 12. Between the upper end of this journal 30 and the hub 31 of the worm wheel 22 is a roller thrust bearing 32.

The lower end 34 of the screw member 26 extends below the frame floor portion 14 and is threaded to receive a nut member 36 having arms 38 depending therefrom along the screw member. These arms are joined together below the lower end of the screw member 26 by a portion 40 to which the upper end 41 of a load connecting rod 42 is secured, the lower end of this rod being connected to a rod 43 through a motor switch and motor switch control mechanism 45. The lower end of the rod 43 is fixed to a bracket 44 welded to the pipe section 10. The mechanism 45 permits rod 43 to move vertically with respect to rod 42 with vertical movement of the load. Such vertical movement of the load changes the force applied by the load to the hanger. The relative movement of rod 43 with respect to rod 42 actuates a switch which forms a part of the mechanism to control the operation of the motor 16 through electrical leads 55. Such a mechanism is described in U.S. Patent No. 2,248,730. More particularly this mechanism 45 may include elements corresponding to the following elements (some of which are not numbered) in Fig. 1 of the Patent No. 2,248,730: spring 9, spring casing, spring piston and piston rod, switches 3, bracket on which switches are mounted and switch actuator mounted on the spring casing.

Also extending from the nut member 36 but in a generally horizontal direction radially outward from the screw member 26 is an arm 46 carrying a roller 48 on its outer end. This roller lies in a slot 50 in the frame and is of such size to prevent rotation of the nut member 36 with respect to the threaded screw member 26 when the motor 16 operates to move this member vertically.

An opening 52 is provided at the bottom 15 of the frame through which the arms 38 of the nut member 36 may extend. The lower end 34 of the screw member is provided with a stop 53 which prevents nut member 36 from running off this end. Adjacent the motor there is provided another opening 54 through which electrical leads 55 are passed from the switch mechanism 45 and an electricity source 47. A hanger rod 56 with suitable nuts 57 suspends the entire frame from a fixed overhead structure (not shown). This device as above described operates as follows: Movement of the pipe section or load 10 upwardly and downwardly changes the force exerted by the load on the hanger and results in relative movement of rods 43 and 42 by means of the mechanism 45, whereupon the switching mechanism 45 is actuated to supply electrical power to the motor 16 to drive it in one direction when the force is decreased and in the opposite direction when the force is increased. The motor drives the worm wheel 22 through the worm gear 20. Such rotation of the worm wheel rotates the screw member 26 and the non-rotatable nut member 36 moves up and down on this screw member depending upon the direction in which the motor is rotated. When the force exerted by the load is increased by downward movement of the load, the resulting downward movement of rod 43 with respect to rod 42 operates the switch to drive the motor, worm wheel and screw 26 in a direction to move the nut 36 and hence rod 42 downwardly until they have been moved by about the same amount as the load and rod 43, whereupon the increase in force is compensated for and the motor is shut off. When the force exerted by the load is decreased by upward movement of the load, the resulting upward movement of rod 43 with respect to rod 42 operates the switch to drive the motor, worm wheel and screw in a direction to move the nut 36 and rod 42 upwardly until they have been moved by about the same amount as the load and rod 43, whereupon the decrease in force is compensated for and the motor is shut off. The friction between the threads on the screw member and nut member tends to cause the nut member to rotate in unison with the rotating screw member, but this tendency to rotate is prevented by the arm member 46 carrying the roller 48. This roller by engaging the sides of the slot 50 in the frame restrains the nut member 36 against rotation and maintains it in one rotative position with respect to the frame while at the same time allowing the nut to move up and down with respect to the screw member and the frame. Thus there is no tendency for the nut member 36 to rotate the connecting rods 42 and 43 or impose any torque thereon or on the bracket connection 44 to the pipe 10. Similarly this friction between the threads of the members 26 and 36 acts as a counter force and tends to cause the nut member 36 to hold the screw member 26 stationary so that the motor 16 tends to drive the worm gear 20 and the motor around the worm wheel 22 and thus rotate the frame with respect to the screw member, nut member and worm wheel 22. However, the provision of the arm 46 on the nut member prevents such frame rotation because the sides of the slot 50 engage the roller 48 when the frame thus tries to rotate with respect to the nut member 36. By thus preventing tendency of the frame to rotate the possibility of any torque in the suspending member 56 is removed. In effect, the rotary force imparted to the nut 36 and applied to the frame in one direction through arm 46 neutralizes the rotary counter force applied to gear 20, motor 16 and the frame in an opposite direction by the resistance of nut 36 to rotation so that no rotary force is transmitted as such externally of the hanger but, except for that which is convereted into straight line motion, it is neutralized and retained in the hanger. Consequently, rotary force is not exerted on the load and since it is not effective to tend to rotate the frame it is not exerted on the rod 56.

Referring now to the arrangements of Figs. 4, 5 and 6, the general arrangement involves rotation of the nut member by the motor with the screw member moving vertically in this nut member. More particularly the device comprises a frame 60 connected to some overhead fixed structure by rod 62 with nuts 64 thereon. This frame may again conveniently take the form of a cylindrical casing with upper and lower end wall portions 65 and 66, respectively. On the inner surface of the lower end wall 66 is mounted an electric motor 68 having a drive shaft 70 with a worm gear 72 secured thereto. This worm gear 72 meshes with a worm wheel 74 mounted with its hub 76 resting on a roller thrust bearing 78 which is in turn resting on a journal 80 formed in the end wall portion 66. The worm wheel 74 has a central threaded opening 82 therethrough and the bearing 78 and journal 80 have unthreaded openings 84 and 86 respectively aligned with the threaded opening 82. A screw member 88 is threadedly received in the worm wheel opening 82 and is connected through a motor switch and motor switch control mechanism 83 to a rod 85 which has its lower end secured to a connection 90 welded to the load to be supported which, in this case, is once again a section of piping 92. Mechanism 83 is the same as that designated as 45 in Fig. 1 and provides relative movement between rod 85 and screw member 88 which operates a switch forming a part of the mechanism, which in turn operates the motor through leads 103. The upper end of the threaded screw member 88 is provided with an arm 94 rigidly secured to this member by means of an aperture in a hub portion 96 and a set screw 97. The outer end of this arm 94 is provided with a roller 98 which engages the sides of a slot 100 in the cylindrical portion of the frame 60. An opening 102 in the casing 60 accommodates electrical leads 103 to the motor. The switching mechanism 83 like the mechanism 45 of Fig. 1 determines when the motor shall be turned on, in which direction, and for how long.

The operation of the device of Figs. 4 to 6 is similar to the operation of the device of Figs. 1 to 3. The motor 68, controlled by the switching mechanism 83, operates to rotate the worm wheel 74 and thereby cause the threaded screw member 88 to move vertically in the worm wheel threaded opening 82. The friction between the threads on the screw member 88 and the threads in the worm wheel opening 82 tends to rotate the screw member 88 in unison with the worm wheel. However, the provision of the arm member 94 fixedly secured to the screw member 88 and guided in the slot 100 prevents any rotations of the screw member with respect to the frame. Accordingly, no rotary force and hence no torque is exerted through the screw member 88 on the connection 90 or on the piping 92. Similarly no torque is exerted on the suspension rod 62 or the frame because the rotational force exerted on the frame by the arm member 94 is resisted by an equal rotational counter force exerted on the frame in an opposite direction by the resistance of screw 88 to rotation. This counter force acts through wheel 74 to tend to rotate gear 72 and motor 68 and hence the frame on which the motor is mounted in a direction opposite from that in which the arm 94 tends to rotate it. Since these rotational forces on the frame oppose each other and are equal they cancel each other out and the hanger is torque free.

Referring now to the device shown in Fig. 7 this is an arrangement like that in Fig. 1 except two screw members are employed and a single nut member is threaded on to both of these screw members. More particularly the device of Fig. 7 has a frame 106 which may conveniently be a cylinder having upper and lower end portions 107 and 108, respectively, and having an intermediate floor portion 110 between these two end portions. A motor 112 is mounted on this floor portion and has its driven shaft 114 provided with a worm gear 116 engaging simultaneously worm wheels 118 and 120 keyed to the upper ends of screw members 122 and 124, respectively. The hub portions 126 and 128 of these worm wheels rest upon thrust bearings 130 and 132 which in turn rest upon journal portions 134 and 136 formed on the intermediate floor portion 110 and accommodating the screw members. The latter pass down through the thrust bearings and journals and extend below the floor portion 110 to the lower end of the casing 108 where they are journalled at 137 and 138. Portions of these screw members are located intermediate the floor portion 110 and the casing end portion 108 are threaded and each passes through a threaded opening in a single nut member 139. A connecting member 140 having its upper end 142 secured to the nut member 139 and having its lower end connected with a rod 144 through a motor switch and motor switch control mechanism 145 similar to that designated as 45 in Fig. 1. Rod 144 is secured to a bracket 146 connected to the load 148 and passes through an opening 150 in the lower casing end 108.

In operation the motor 112 controlled by the switching mechanism of 145 drives the two worm wheels and thereby rotates the two screw members with respect to the frame. The single nut member threadedly engaging the two screw members moves vertically thereon as the screw members rotate. The friction between the threads of each screw member and of the nut member opening through which that screw member passes tends to rotate the nut member in unison with that screw member. However, this tendency is overcome by the engagement of the other screw member with the other threaded opening in the nut member. Thus in effect each screw member acts as a guide for the nut member with respect to the rotation tendency produced by friction between the nut member and the other screw member. Also the rotary counter force exerted by the nut on each screw and hence on the motor and frame by its resistance to rotation opposes and neutralizes the rotary force applied by the nut to the other screw member and thence to the frame so that the frame does not tend to rotate.

Figure 10:
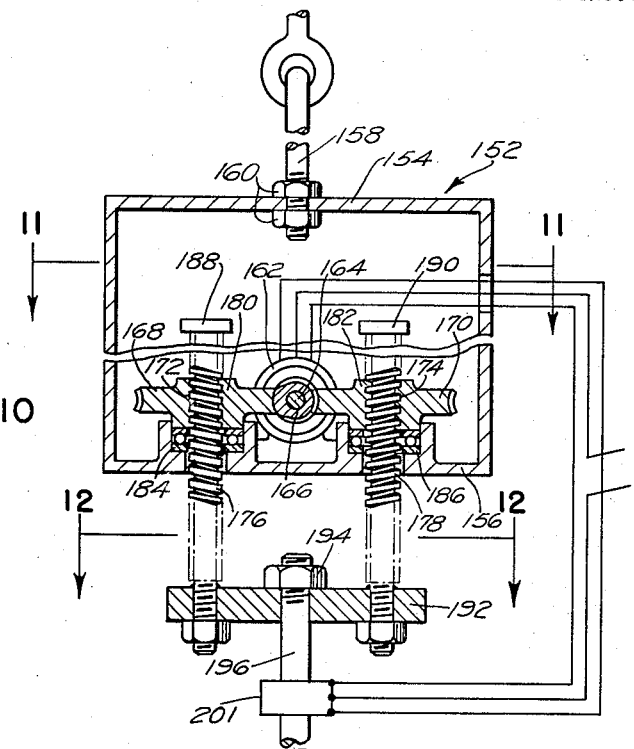
Fig. 10 is a cross-section side elevation view of still another embodiment of the invention with the motor switch and motor control being shown diagrammatically.
Figure 11:
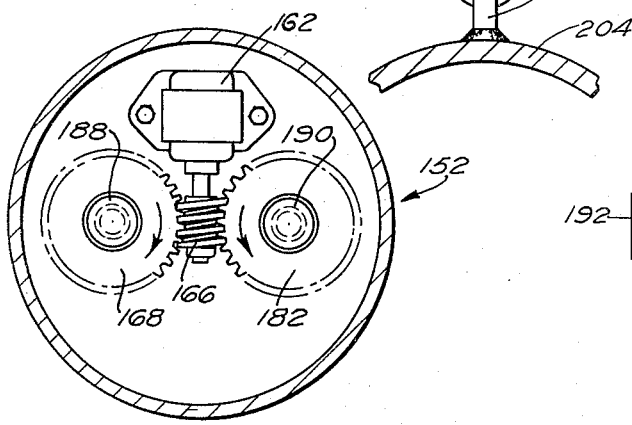
Fig. 11 is a view taken along line 11—11 of Fig. 10.
Figure 12:
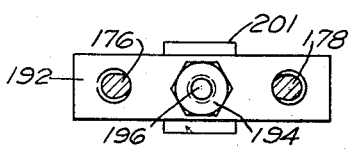
Fig. 12 is a view taken along line 12—12 of Fig. 10.

In the embodiment of Fig. 10 two screw members are again employed, but unlike the embodiment of Fig. 7, the motor rotates the nut members and the screw members are in threaded engagement with openings in the nut members so that the screw members move vertically with respect to the frame. More particularly the frame in the embodiment of Fig. 10 may conveniently be a cylindrical casing 152 having upper and lower end portions 154 and 156, respectively, and having a rod 158 suspending this frame from overhead fixed structure (not shown) by connecting the lower end of the rod to the upper casing end portion with nuts 160 and by connecting the upper end of the rod to fixed structure in a suitable manner. The inner surface of the lower casing end portion has mounted thereon a motor 162 carrying on its shaft 164 a worm gear 166 which simultaneously meshes with a pair of worm wheels 168 and 170, respectively. These worm wheels have threaded central openings 172 and 174 receiving threaded screw members 176 and 178 and having the lower faces of their hub portions 180 and 182 resting on thrust bearings 184 and 186. These thrust bearings, in turn, rest upon journals formed on the inner surface of the lower casing end portion. The upper ends of the screw members are provided with stops 188 and 190, respectively, to prevent accidental movement of the screw members 176 and 178 entirely through the threaded openings 172 and 174.

The lower ends of the screw members are connected together by a cross piece 192 which is engaged at its center between the screw members by a nut 194 on the upper threaded end of a load rod 196 the lower end of which is connected with a rod 200 through a motor switch and motor switch control mechanism 201 like that designated as 45 in Fig. 1. The lower end of rod 200 is provided with an eye secured to a bracket 202 welded to the load 204. The screws 176 and 178 are non-rotatable with respect to the cross piece 192 so that rotation of each screw tends to rotate the cross piece in the same direction.

In operation the motor 162 controlled by the switching mechanism of 201 in the same manner that motor 16 is controlled in Fig. 1 by switching mechanism 45, operates to simultaneously rotate the two worm wheels and these in turn drive the two screw members vertically through the threaded worm wheel openings. The friction between the threads on each screw member and the threads in the worm wheel opening which receives that screw member tends to rotate the screw member and the cross piece 192 in unison with the rotating worm wheel. However, such screw member rotation is prevented by the cross piece 192. The tendency of one screw member to rotate this cross piece about the screw member axis is prevented by the connection of the cross piece to the other screw member. The rotational counter force applied by each screw member and worm wheel to the gear 166 and hence to the motor and frame due to the resistance of such screw member to rotation opposes and cancels out the rotational force applied by such screw member through cross piece 192 to the other screw member and thence to the frame. Accordingly, no torque is imposed either on the connecting member 196 or on the suspension rod 158. Members 43, 85, 144 and 200 are supported members for supporting the load and are in turn supported in each case by the frame, the top wall 13, 65, 107 and 154 of which comprises a fixed anchor means. Wheel 22, screw 26 and nut 36 in Fig. 1 and nut 74 and screw 88 in Fig. 4 and wheels 118 and 120, screws 122 and 124 and nut 139 in Fig. 7 and wheels 168 and 170 and screws 176 and 178 in Fig. 10 comprise means for changing the effective length of the hanger between the anchor plates 13, 65, 107 and 154 and the load by converting the rotary motion of wheel 22, wheel 74, wheels 118 and 120 and wheels 168 and 170 respectively into straight line motion of nut 36, screw 88, nut 139 and screws 176 and 178 respectively. The motor comprises means for actuating the length adjusting means. In each case the rotary force imparted as such to the portion moving in a straight line is imparted to the frame and the rotataional counter force exerted by the resistance of the straight line moving member to rotation is also applied to the frame in an opposite direction so that the two rotational forces counteract and neutralize each other. Although in Fig. 1 the nut is provided with an arm which engages the frame casing it may also engage a rod which extends downwardly or upwardly from a horizontal wall and which forms part of the frame. Instead of an arm engaging such a rod, the rod may extend into an aperture in the nut so that the nut is free to move vertically with relation to the rod but is prevented by the rod from rotating.

I claim:

1. A constant support hanger comprising a supported member to which a load is adapted to be applied, anchor means for supporting said supported member, means for adjusting the effective length of said hanger between said load and said anchor means comprising means for converting rotary motion to straight line motion, means for actuating said length adjusting means by providing it with said rotary motion, means responsive to changes in the force applied to said supported member by said load for actuating said actuating means to adjust the effective length of the hanger between said load and said anchor means, to compensate for said changes in force, means on the supported member adjacent the end thereof which is remote from the load and engaging the anchor means for neutralizing and retaining within the hanger rotary force in excess of that which is converted into straight line motion whereby substantially no rotary force is transmittted externally of the hanger.

2. A constant support hanger comprising a supported member to which a load is adapted to be applied, anchor means for supporting said supported member, means for adjusting the effective length of said hanger between said load and said anchor means comprising means for converting rotary motion of a rotating member to straight line motion of a cooperating member to which said supported member is operably connected, means for actuating said length adjusting means by providing it with said rotary motion, means responsive to changes in the force applied to said supported member by said load, for actuating said actuating means to adjust the effective length of the hanger between said load and said anchor means, to compensate for said changes in force, means on the supported member adjacent the end thereof which is remote from the load and engaging the anchor means for neutralizing rotary force imparted to said cooperating member by the rotary member and the rotary counter force which is applied to said rotating member by resistance of the cooperating member to rotation.

3. A constant support hanger according to claim 2 having a frame and wherein said forces are applied to said frame in opposite directions and in opposition to each other, whereby they neutralize each other.

4. A constant support hanger comprising a supported member to which a load is adapted to be applied, anchor means for supporting said supported member, means for adjusting the effective length of said hanger between said load and said anchor means comprising means for converting rotary motion of a rotating member to straight line motion of a cooperating member which is operably connected to said supported member, means for actuating said length adjusting means for providing it with said rotary motion, means responsive to changes in the force applied to said supported member by said load for actuating said actuating means to adjust the effective length of the hanger between said load and said anchor means, to compensate for said changes in force, means on the supported member adjacent the end thereof which is remote from said load and engaging the anchor means for applying to a portion of said hanger rotary force imparted to said cooperating member by said rotating member, means for applying to said portion of said hanger in a direction opposite to the direction in which said last mentioned rotary force is applied, the rotary counter force applied to said rotating member by the resistance of the cooperating member to rotation, whereby said rotary forces oppose and substantially neutralize each other thereby preventing the application of said rotary forces externally of the hanger.

5. A constant support hanger comprising a supported member to which a load is adapted to be applied, anchor means for supporting said supported member, means for adjusting the effective length of said hanger between said load and said anchor means comprising means for converting rotary motion of a rotating member to straight line motion of a cooperating member to which the supported member is operably connected, means for actuating said length adjusting means for providing it with said rotary motion, means responsive to changes in the force applied to said supported member by said load for actuating said actuating means to adjust the effective length of the hanger between said load and said anchor means, to compensate for said changes in force, means on the supported member adjacent the end thereof which is remote from said load and engaging the anchor means for restraining said cooperating member against rotary movement to thereby prevent the application of rotary force to the load.

6. A constant support hanger according to claim 5, said means for actuating said length adjusting means comprising a motor, said means for adjusting the length of said hanger comprising a screw member and a nut, one of which is rotatable by said motor to impart to the other straight line motion and means associated with the hanger for restraining said other of said screw member and nut assembly against rotary movement.

7. A constant support hanger according to claim 6 wherein said hanger has a frame, said motor being mounted on said frame, means associated with said other of said screw member and nut assembly and adapted to engage said frame to restrain said other of said screw member and nut assembly against rotation, said supported member being operably connected to said other of said screw member and nut assembly.

8. A hanger according to claim 7 wherein said frame is suspended from a structure element of a building by a rod.

9. A constant support hanger according to claim 6 wherein said anchor means comprises a part of a hanger frame, wherein said motor is mounted on said frame and said other of said screw member and nut assembly has an arm which is adapted to engage the frame to restrain said other of said screw member and nut assembly against rotation thereof, said supported member being operably connected to said other of said screw member and nut assembly.

10. A hanger according to claim 9 wherein said hanger frame comprises a casing which has a slot therein extending in the direction in which said other of said screw member and nut assembly moves, said arm extending into said slot.

11. A hanger according to claim 5 wherein said means for actuating said length adjusting means comprises a motor, said means for adjusting the effective length of said hanger comprising nut means and a pair of screw members, one of said nut means and said pair of screw members being rotatable by rotation of said motor to impart straight line motion to the other and means associated with the hanger for anchoring said other of said nut means and said pair of screws against rotation.

12. A hanger according to claim 11 wherein said pair of screws is rotatable by said motor to impart straight line movement to said nut means and said nut means comprises a nut through which both screws extend.

13. A hanger according to claim 11 wherein said nut means comprises a pair of nuts which are rotatable by said motor to impart straight line movement to said pair of screws, said pair of screws being spaced from each other and being non-rotatably mounted in a cross piece to which said supported member and said load are operably connected.

14. A constant support hanger comprising a supported member to which a load is adapted to be applied, anchor means for supporting said supported member, means for adjusting the effective length of said hanger between said load and said anchor means including a screw member and a nut, a motor for rotating said screw member to impart a straight line motion to said nut, said supported member and load being operably connected to said nut, means on said nut for engaging said anchor means and preventing rotation of said nut with respect to said anchor means, means responsive to changes in the force applied to said supported member by said load for actuating said actuating means to rotate said screw member and impart straight line movement to said nut to adjust the effective length of the hanger between said load and said anchor means, to compensate for said changes in force.

References Cited in the file of this patent

UNITED STATES PATENTS

| | | |
|---|---|---|
| 2,225,515 | Wood | Dec. 17, 1940 |
| 2,248,730 | Wood | July 8, 1941 |
| 2,663,534 | Hinckle | Dec. 22, 1953 |